United States Patent [19]

Baur et al.

[11] 4,134,634

[45] Jan. 16, 1979

[54] EXPLOSION-PROOF AUTOMATIC RELEASE HELICOPTER TOW CONNECTOR

[75] Inventors: Robert Baur, Los Angeles; Ralph Iversen, Granada Hills, both of Calif.

[73] Assignee: Automation Industries, Inc., Los Angeles, Calif.

[21] Appl. No.: 832,394

[22] Filed: Sep. 12, 1977

[51] Int. Cl.² .............................................. H01R 13/54
[52] U.S. Cl. .................................. 339/75 M; 114/247; 244/3; 339/91 R
[58] Field of Search .................... 114/244, 247; 244/3; 339/91 R, 75 M

[56] References Cited

U.S. PATENT DOCUMENTS

| 3,375,324 | 3/1968 | Miller | 114/244 X |
| 3,430,184 | 2/1969 | Acord | 339/91 R X |
| 3,452,316 | 6/1969 | Panril et al. | 339/91 R X |
| 3,940,732 | 2/1976 | Hudson et al. | 114/244 X |

Primary Examiner—Roy Lake
Assistant Examiner—E. F. Desmond
Attorney, Agent, or Firm—Anthony W. Karambelas

[57] ABSTRACT

Connector for tow cable which carries tow tension and electrical circuits permits release of both the tension and the circuits. Electrical connectors in high current circuits are arranged so that the male connector is pulled out of the female electric socket, and the arc between them is elongated, but the arc chamber is closed until the arc is extinguished.

8 Claims, 5 Drawing Figures

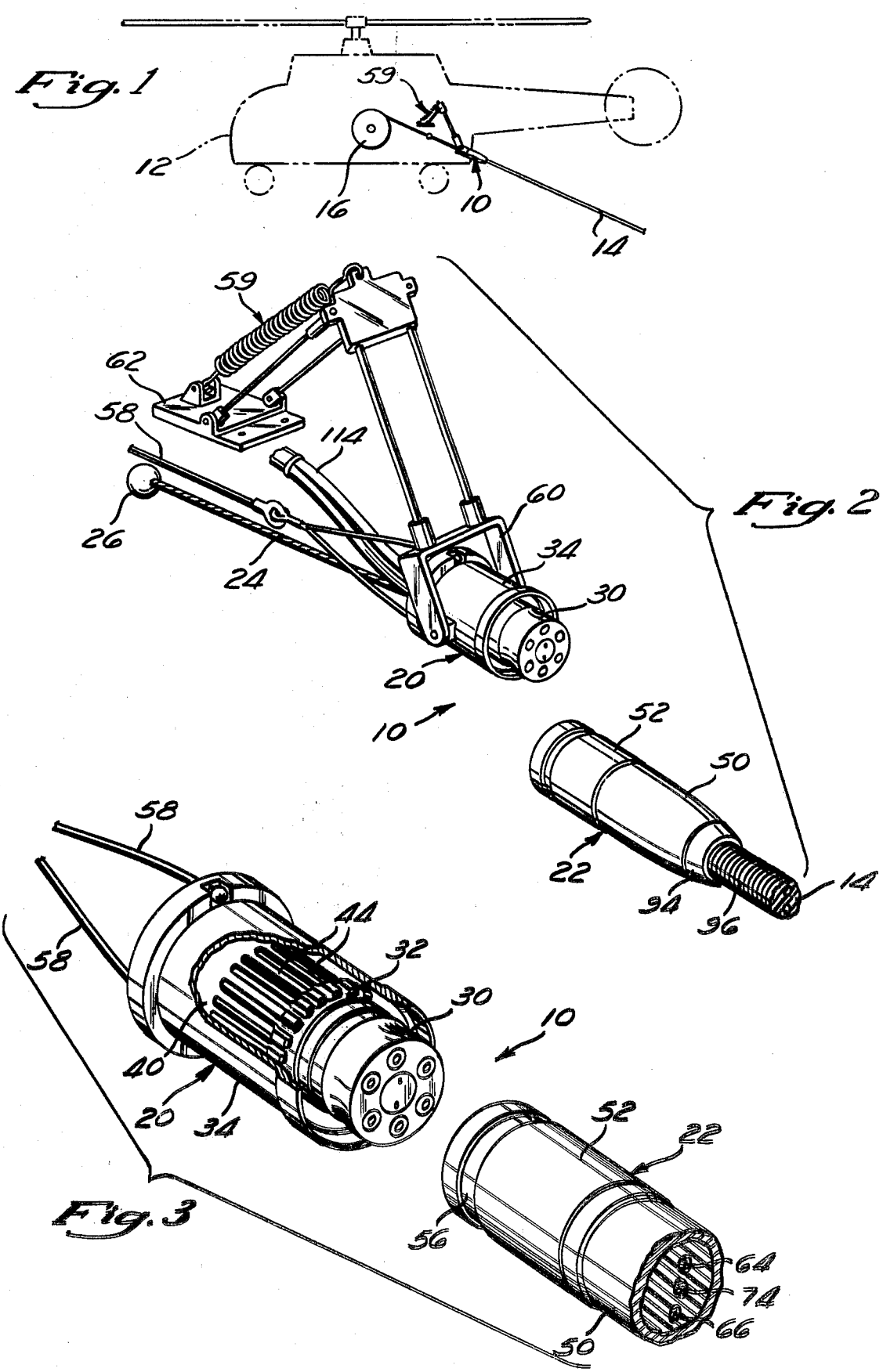

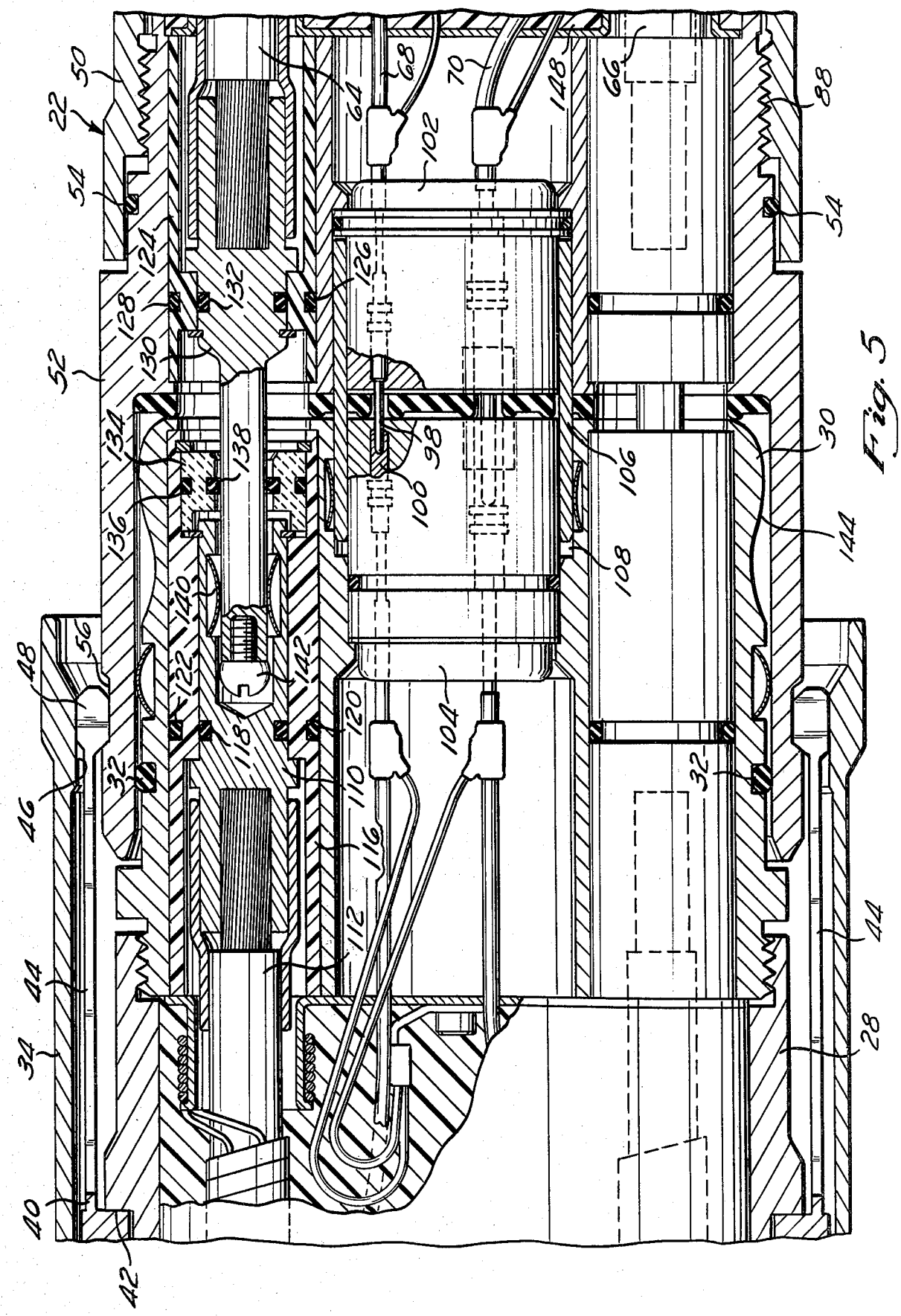

EXPLOSION-PROOF AUTOMATIC RELEASE HELICOPTER TOW CONNECTOR

This invention is made under a contract with the Department of Defense of the United States Government.

BACKGROUND OF THE INVENTION

This invention is directed to an explosion-proof automatic release tow connector and a connector useful in other explosive environment situations.

In the particular case of a helicopter towing an underwater signalling and sensing device, it is necessary to supply both tow tension forces through the tow cable and to supply power and receive sensing information from the device being towed. Quite often the device is an active underwater radiator and detector where radiant energy is supplied to the underwater environment and reactions are sensed. Such efforts are useful particularly in determining the state of the water and the presence of things therein. For example, tow devices can be towed at considerable depths so that effects can be accomplished and sensing done which cannot be done at the surface of the water. This brings about a major problem, because a towed device can snag on an underwater obstruction. If the towed device is being towed by a helicopter, as is envisioned here, the helicopter can be brought down by a sudden, large increase in tension on the tow line. To overcome this problem, a disconnect device, both for the tow line tension and for the electrical conductor in the tow line, is necessary. Due to the fact that the environment is within a helicopter, explosion-proof separation is required. Such has been difficult to achieve in an electrical connector which must disconnect when current is passing therethrough.

SUMMARY OF THE INVENTION

In order to aid in the understanding of this invention, it can be stated in essentially summary form that it is directed to an explosion-proof automatic release helicopter tow connection. This is accomplished by sealing around the male connector pin and maintaining the seal as the male connector pin is withdrawn from the female electrical connector socket, with electrical separation in the female socket and sufficient withdrawal distance of the male connector pin to permit arc quenching before the male connector pin is withdrawn from its seal. Thus, all arcing is in the female recess and is quenched before the seal is opened by full withdrawal of the male pin.

It is thus an object of this invention to provide an explosion-proof cable connector whereby arcing is quenched before the female recess is open to ambient conditions. It is a further object to provide a helicopter tow connector which releases both electrical connections and tow connections when required, under explosion-proof conditions. It is a further object to provide a tow connector wherein the cables which constitute both the tension and conductor cables are placed in an appropriate strain relief structure to transfer tensile loads from the cable to the connector body. It is a further object to provide an economic and reliable structure whereby a towed device can be released both from the tow cable and from the electrical connection.

Other objects and advantages of this invention will become apparent from study of the following portion of the specification, the claims, and the attached drawings.

BRIEF DESCRIPTION OF THE DRAWINGS

FIG. 1 is a side-elevational view of the explosion-proof automatic release helicopter tow connector of this invention shown in association with the helicopter, shown in dotted lines.

FIG. 2 is an exploded view of the connector of this invention, in the separated condition.

FIG. 3 is an enlarged view similar to FIG. 2, with parts broken away.

FIG. 5 is a further enlarged view, principally of the electrical connection area of the connector of this invention showing the internal details thereof, including the connector pins and the conductor terminations.

DESCRIPTION OF THE PREFERRED EMBODIMENT

Figure 4:
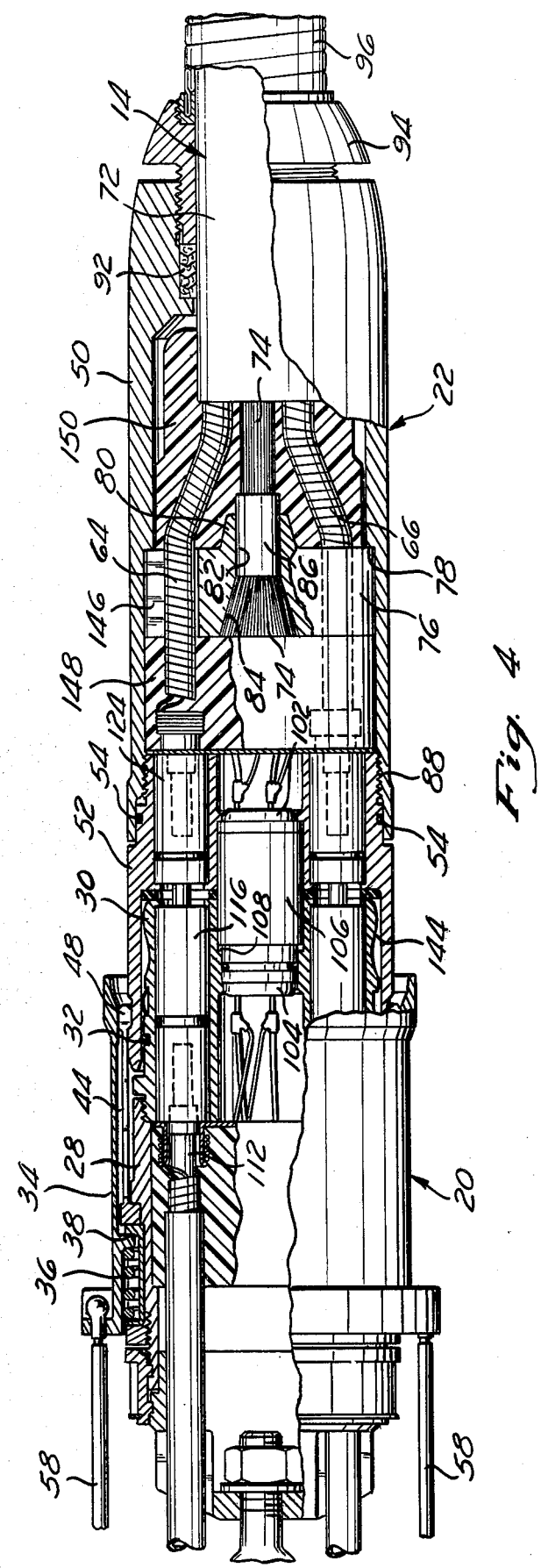
FIG. 4 is a side-elevational view, with parts broken away and parts taken in section, of the connector of this invention shown in the connected condition.

The connector of this invention is generally indicated at 10 in each of FIGS. 1 through 5. In FIG. 1, helicopter 12 is arranged to tow therebehind cable 14, which has both tensile and electrically conductive characteristics so that a device having sensors and/or electric energy using devices can be towed behind the helicopter. Quite often, these devices are underwater devices which produce impulses of sonic nature and sense the reflections. Should the device on the underwater end of the cable 14 be snagged upon an obstruction, then it is necessary for the underwater device to be released before helicopter 12 is pulled down. The same conditions arise for other types of devices which may be towed behind the helicopter, including above-water devices. Connector 10 has the means to carry both the tensile-towing force and the electrical connections, with breakaway when tension exceeds a predetermined force. Furthermore, over-tension breakaway must also be accomplished without arcing, even under electrical load, in order to reduce danger to the helicopter.

Helicopter 12 carries winch reel 16. Connector 10 is divisible into the forward, female connector body 20 and after connector body 22. As is seen in FIGS. 1 and 2, lead cable 24 is connected to forward body 20 and terminates on its forward end in tow ball 26. Tow ball 26, see FIG. 2, is seated in a tow socket secured to the helicopter frame during normal towing but is connectable to winch reel 16 for windup and deployment of connector 10 and its following cable 14. Thus, winch reel 16 can be connected to tow ball 26 to pull in the connector 10, cable 14, and towed equipment for its retraction from service position, as well as unwinding to deploy the cable, its connector, and towed device. Furthermore, winch reel 16 carries a normally stowed ancillary cable on the payout reel in the helicopter. This ancillary cable is not employed in normal towing operations, but is employed to effect air-to-air transfer of the towed device. To effect such transfer, the ancillary cable is connected to plug 22 and connector 10 is released. This allows the rear plug half of the tow connector 10 and its cable 14 to drop into the water as the ancillary cable is paid off from the reel. When the ancillary cable is completely wound off, except for its front-end locking ball, a second helicopter snags the ancillary cable and pulls it up with its tow boom. Thereupon, the first helicopter releases the locking ball of the forward end of the ancillary cable to release the entire structure. The second helicopter pulls up the ancillary cable, winds it on its winch reel, 16, until connector 10 is in position for attachment to its socket 20.

As is seen in FIGS. 3, 4, and 5, forward body 30 is comprised of main forward body member 28 which is of tubular construction, and serves as the main strength member on which other parts are supported. Nose 30 is screw-fitted thereon and carries sealing O-ring 32. Release sleeve 34 is tubular in nature and is positioned around main forward body member 28. Spring 36, see FIG. 4, urges release sleeve 34 in the aft direction to the locking position shown in FIGS. 4 and 5. In this position, stop shoulders 38 engage, see FIG. 4. This is the aft limit position of the release sleeve.

Locking body 40 is held into the aft position by being locked against shoulder 42, see FIG. 5. Its after end is slotted to form fingers 44 and the after end of the fingers is larger to form locking lugs 48. When release sleeve 34 is in its aft position, its control diameter 46 is positioned around the locking lugs 48 to constrain expansion thereof.

Main after body member 50 carries cylindrical locking tube 52 screwthreaded on the forward end thereof, see FIGS. 4 and 5. Sealing is accomplished by O-ring 54. The forward end of locking tube 52 engages around nose 30 and engages over sealing O-ring 32. Recess 56 around nose 30 is annular and is axially positioned to receive locking lugs 48 when locking tube 52 is fully engaged on nose 30. When in recess 56 locking lugs 48 are locked in place by permitting release sleeve 34 to be spring-thrust back into the locked position shown in FIGS. 4 and 5. In view of the compression of spring 36, the structure stays locked until release sleeve 34 is pulled to the left in the forward direction. Lanyard 58, see FIGS. 2, 3, and 4, is attached to the release sleeve 34. Thus, when release sleeve 34 is pulled in the forward direction, release is accomplished. Lanyard 58 is for manual release, as when transfer from helicopter to helicopter is to be achieved. Automatic release is accomplished when cable tension exceeds the allowable and winch torque is overcome to permit the connector to move aft in the helicopter. When it moves aft, the lanyard pulls tight and causes release. Tow boom 59 is a support device and has its yoke 60 loosely clamped around release sleeve 34 and its plate 62 secured to its helicopter structure for free support of the connector during movement of the cable and connector. In this way, automatic release at the tension permitted by the winch is achieved.

Cable 14 is made up of an assemblage of high-power electrical conductors and low-power electrical conductors which can be used either for control or signalling functions. Preferably, the high-power conductors are three or multiples of three in number so that they can be employed in three-phase power systems, and two of the high-power conductors are shown at 64 and 66 in FIGS. 4 and 5. In FIGS. 2 through 5, the high-power conductors are shown to be six in number either for six-phase power or preferably for providing duplicate circuit paths to reduce current in individual conductors. Also, six such conductors are more conveniently bundled into a cable. If only three are used, three fillers also must be used. Two of the low-power conductors are shown at 68 and 70 in FIG. 5. They are bundled in the cable in the interstices between the high-power cables. A smooth outer jacket 72 of flexible water-proof material such as high-density polyethylene is provided. Each of the conductors is separately insulated and has sufficient cross section and conductivity to provide the necessary current-carrying capability. The high-power conductors are preferably of aluminum, as are the low-power conductors, for maximum conductivity per weight.

Cable 14 must also include tension member 74 which forms the center of the cable. In view of the fact that the entire cable is designed for high electrical and mechanical performance with respect to weight, tension member 74 is selected to be of high stength-to-weight ratio material. Tension member 74 is a flexible rope constructed of high-stength synthetic aramid fibers developed by E. I. DuPont Nemours and carries the trademark "Kevlar". It functions as the mechanical strength member of the tow cable. While other tension members are acceptable, this aramid material has a tensile strength-to-weight ratio about five times that of steel wire cable. The aramid rope must be terminated to the after connector body 22 so that the towing forces can be transmitted through connector 10 to the towing helicopter.

Strain relief member 76 has basically a cylindrical grip which engages against shoulder 78 in main after body member 50. Strain relief member 76 has a tapered shank 80 toward cable 14 and has an opening 82 through which aramid rope 74 extends. The forward end of the opening provides conical wall 84, which has its larger end facing forward. The portion of aramid rope 74 which extends through opening 82 is wrapped with tape 86 to fill the cylindrical part of the opening. Within the portion of the opening defined by the conical wall 84, the rope is unraveled. Each of the seven principal rope members is unraveled into individual strands. The strands are cleaned with a spare amount of methyl ethyl keytone, are spread in the conical area, and the cone is filled with thermosetting epoxy. While aramid is a high strength-to-weight fiber, it needs protection to obtain adequate flexure and abrasion resistance in rope form. Thus, each of the strands is coated with polyurethane so that the resultant rope has the combination of outstanding tensile properties of the aramid fiber with the equal outstanding flex and abrasion resistance of urethane. The cleaning must be carefully done in order to minimize the removal of the urethane coating. In this way, the tension in cable 14 is transferred to strain relief member 76 and thence to main after body member 50 and through threaded connection 88 to cylindrical locking tube 52 for transfer to the forward end of connector 10, as previously described. Threaded connection 88 is sealed by O-ring 54.

Sealing of main after body member 50 to outer jacket 72 of cable 14 is accomplished by means of packing material 92 positioned in a packing gland and compressed by compression member 94. In view of the large tolerance of the outside diameter of the tow cable, a series of rings of square cross section which can be compressed into sealing engagement are used.

Compression nut 94 carries a spiral stainless steel metal hose 96 secured thereto. Attachment of the hose to the compression nut is achieved by brazing a ferrule onto one end of the hose, seating the ferrule in a recessed threaded cavity, and retaining the ferrule and the hose assembly in place with a spanner nut. The internal diameter of the metal hose is slightly larger than the tow cable. A rubber grommet is provided on the free end of the hose to eliminate chafing of the tow cable jacket at that point. The purpose of the metal hose is to limit the amount of bending of the cable at the point of entry of the cable into the connector, thus preventing undesirable tension stresses on the tow cable components and their termination points.

Electrical interconnection is achieved between the forward connector and the after connector by means of female or receptacle connective portions in the forward body and male or pin portions in the after connector body. Low power conductor 68 is connected to conductor 96 by means of pin 98 entering into socket 100. A plurality of such pins and sockets are positioned within plug connector 102 and receptacle connector 104, which are positioned on the center line of the connector structure. Sleeve 106 is mounted on plug connector 102 and is received in annular recess 108 around the connector end of receptacle 104. Different pins and sockets in connector houses 102 and 104 may have difference engagement lengths, but the engagement length of sleeve 106 in recess 108 is farther than the engagement of any one of the pins in any one of the sockets. Thus, as the after connector body 22 is pulled away and the pins are withdrawn from their sockets, each of them is disconnected before sleeve 108 pulls out of recess 106. Thus, any arcing is confined to the zone within the sleeve. One of the pins, for example pin 98, is shorter than the others so that it disconnects first.

Arc containment is individually achieved in the main power connectors where socket connector 110 is secured in insulative spacer block 116 within main forward body member 28, inside of nose 30. It is electrically connected by crimping to conductor 112, which is part of the cable 114, see FIG. 2, extending forward into the power source and control equipment in the helicopter. Spacer block 116 holds each of the socket connectors in place. The socket connectors are sealed within the spacer block, as by O-ring 118, while the spacer block is interiorly and exteriorly sealed by O-rings 120 and 122.

Similarly, spacer block 124 is secured in and sealed in the after end of locking tube 52, as by O-rings 126 and 128. Connector pin 130 is one of a plurality, one for each high-power conductor to be connected. It is crimped on the forward end of high-power conductor 64 and is sealed in spacer block 124 by O-ring 132. Nose 142 on the pin is of insulator material. With connectors 102 and 104 also sealed with respect to the spacer blocks, the entire end face of each of the connectors is sealed against entry of foreign materials, particularly sea water.

Ceramic ring 134, see FIG. 5, is positioned within an opening in spacer block 116 in line socket connector 110. It is held in place by a snap ring and is sealed by means of O-ring 136. It has an internal O-ring 138 which seals around the forward, pin portion of connector pin 130. Electrical connection between pin 130 and socket connector 110 is by means of connector springs 140. With the sealing accomplished by O-ring 32 and O-ring 138, hostile environment is sealed out of the connection between socket connector 110 and connector pin 130.

Upon separation of the connector 10 while power is being supplied, when the shank of pin 130 is withdrawn from spring 140, arcing occurs. This arcing propagates between the sides of the pin and is not transferred to the nose because the nose 142 is dielectric. The external hostile envirnment is excluded from this socket volume because of the seal 138 and the seal 32. Thus, during arcing, flammable vapors are maintained away from the contact area. The arc may extend, but as the dielectric nose 142 starts into the opening in ceramic bushing 134, the arc is quenched. Should any explosive condition occur, it is contained within the small and enclosed contact volume. By the time the extended dielectric end of the pin exits out of the entral cavity opening in seal ring 134 so that the hostile environment is free to enter, the arc has already been extinguished, and ignition of the explosive environment has been curtailed. Nose 30 is rounded at 144 into an approximately partially spherical shape so that, as the after connector body 22 is mostly disconnected, then it does not hang up by cocking on the righthand end of nose 30.

Conductors 64 and 66, as well as the other high-power and low-power conductors, are positioned around the central opening in strain relief member 76. Strain relief memeber 76 is slotted, as at 146, with one slot for each of the high-power conductors and adequate slot area for the low-power conductors. These conductors are led forward into the pin connection area and, when everything is in place, potting compound 148 is poured in front of strain relief member 76. Potting 150 can either have been molded in place before installation within main aft body member 50, or can be potted at the same time.

By this structure, an airborne connector plug which connects high power or low-power and tension member is accomplished with electrical isolation, shielding, strain relief of the tension rope, explosion-proofing, shell-to-shell grounding, anti-bind rolloff, polarization, and sealing are all accomplished in a connector of reasonable size for its many high-performance duties.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims:

What is claimed is:

1. A tow connector for connecting tension members for towing and for connecting electrical conductors so that a towed device is both physically drawn and electrically connected, said connector comprising:
   a forward connector body and after connector body, said after connector body having connector pins thereon and having tow line securing means therein, said forward connector body having pin receptacles therein and having tension member connector means thereon;
   means for releaseably connecting said forward and said after connector bodies together, said releaseable connection means comprising locking lugs on one of said bodies engaging into a recess on the other of said bodies, and a release sleeve engaging against said locking lug to retain them in said recess for retaining said bodies together and for drawing away from said locking lugs to permit said locking lugs to be withdrawn from said recess to permit separation of said bodies.

2. A connector for mechanically and electrically connecting a tow cable having a tension member therein and a plurality of electrical conductors therein, said connector including a main forward body member and a main after body member, said main forward body member being for electrical and mechanical tow connection to a towing machine and said after main body member being for electrical and mechanical connection to said forward main body member, said cable being connected to said after main body member;
   a strain relief member in said after main body member, said strain relief member being a disc having a central opening therethrough, said central opening being defined by a conical wall having a larger diameter directed forwardly in said connector, said tension member extending through said central opening and being expanded in said conical opening, epoxy in said conical opening to attach to said tension member to prevent said tension member from pulling out of said opening so that tension in said tension member is transferred to said strain relief member and to said after main body member.

3. The connector of claim 2 wherein said electrical conductors in said cable pass through said strain relief member and terminate in said after main body member forward of said strain relief member.

4. The connector of claim 3 wherein said strain relief member is slotted so that said electrical conductors pass through said slots in said strain relief member.

5. The connector in claim 4 where in connector pins are mounted inside after said main body member, said forward main body member carrying sockets to receive said pins so that the electrical connection is made between the forward and after portions of said connector.

6. The connector of claim 5 wherein seals in said socket connectors engage around said pins and seal against said pins until said pins are withdrawn out of electrical contact with said socket connector.

7. The connector of claim 2 wherein an electrical connection between said forward connector body and said after connector body comprise pins and sockets, with said pins being mounted on one of said bodies and said sockets being mounted on the other of said bodies, each of said bodies having an insulated spacer block therein for positioning and electrically separating said contacts, a seal ring in at least one of said socket connectors engaging around said pin of said pin connector for sealing said socket connector from the external environment, said socket connector having a contact spring therein and said seal in said socket connector being positioned so that, as said pin connector is withdrawn therefrom, said pin connector separates from said contact spring before said pin is withdrawn from said seal so that arcing occurs in a confined location.

8. The connector of claim 7 wherein a dielectric nose is mounted on said pin connector so that sealing is maintained around said pin connector even when the conductive portion of said pin connector is withdrawn out of the sealed connector cavity.

* * * * *